United States Patent
Halasa et al.

(10) Patent No.: US 7,335,706 B1
(45) Date of Patent: Feb. 26, 2008

(54) METHOD OF MAKING ALKOXY FUNCTIONALIZED RUBBERY POLYMERS

(75) Inventors: Adel Farhan Halasa, Bath, OH (US); Wen-Liang Hsu, Cuyahoga Falls, OH (US); Scott K. Armstrong, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 11/682,050

(22) Filed: Mar. 5, 2007

(51) Int. Cl.
*C08F 8/40* (2006.01)
*C08F 8/18* (2006.01)
*C08F 4/48* (2006.01)

(52) U.S. Cl. .................. 525/332.3; 525/340; 525/342; 525/359.3; 525/370; 524/572; 526/175

(58) Field of Classification Search ............ 525/332.3, 525/340, 342, 359.3, 370; 526/175; 524/572
See application file for complete search history.

(56) References Cited

U.S. PATENT DOCUMENTS

| | | | |
|---|---|---|---|
| 5,017,636 A | 5/1991 | Hattori et al. | |
| 5,130,355 A * | 7/1992 | Hergenrother et al. | ......... 524/71 |
| 5,508,333 A | 4/1996 | Shumizu | |
| 5,508,336 A | 4/1996 | Takeichi et al. | |
| 5,700,888 A | 12/1997 | Hall | |
| 5,821,290 A * | 10/1998 | Labauze | ..................... 524/188 |
| 5,834,536 A | 11/1998 | Scholl | |
| 5,866,650 A | 2/1999 | Lawson et al. | |
| 5,916,961 A | 6/1999 | Hergenrother et al. | |
| 5,977,238 A | 11/1999 | Labauze | |
| 6,156,822 A | 12/2000 | Materne et al. | |
| 6,166,108 A | 12/2000 | Materne et al. | |
| 6,172,138 B1 | 1/2001 | Materne et al. | |
| 6,359,075 B1 | 3/2002 | Wollum et al. | |
| 6,417,270 B1 | 7/2002 | Wollum et al. | |
| 6,451,935 B1 | 9/2002 | Schreffler et al. | |
| 6,573,412 B1 * | 6/2003 | Hogan et al. | ................ 568/616 |
| 6,627,715 B2 | 9/2003 | Halasa et al. | |
| 6,995,224 B2 | 2/2006 | Halasa et al. | |
| 7,119,150 B2 * | 10/2006 | Lin et al. | .................. 525/332.6 |
| 2003/0069332 A1 | 4/2003 | Agostini et al. | |
| 2004/0249020 A1 | 12/2004 | Sandstrom et al. | |
| 2006/0217473 A1 | 9/2006 | Hergenrother et al. | |
| 2006/0247365 A1 * | 11/2006 | Hochi | ........................ 524/495 |

* cited by examiner

*Primary Examiner*—Fred Teskin
(74) *Attorney, Agent, or Firm*—Wood, Herron & Evans

(57) ABSTRACT

The present invention is directed to a method for synthesizing rubbery copolymers, such as styrene-butadiene rubber, or rubbery homopolymers, such as polybutadiene rubber, that are alkoxy functionalized, e.g., alkoxysilane functionalized, and provide desirable dispersion of silica in rubber compounds, such as for use in tire treads. To that end, the method, in one embodiment, involves admixing anionically polymerizable conjugated diene monomers with optional vinyl aromatic, an anionic-polymerization initiator, i.e., an organolithium compound, and a lithium alkoxide to form an admixture of living polymers, then adding a halogenated coupling agent to the admixture of living polymers effecting conditions to form an alkoxy functionalized rubbery polymer. The alkoxy functionalized rubbery polymers can be utilized in tire tread rubbers where the rubbery polymers may provide desirable wear properties without substantially sacrificing other performance characteristic(s), e.g., traction properties.

17 Claims, No Drawings

METHOD OF MAKING ALKOXY FUNCTIONALIZED RUBBERY POLYMERS

FIELD OF THE INVENTION

The present invention is directed to methods for synthesizing alkoxy functionalized rubbery polymers for use in tire tread rubbers.

BACKGROUND OF THE INVENTION

It is desirable to produce rubber compounds exhibiting reduced hysteresis when properly compounded with other ingredients such as reinforcing agents, followed by vulcanization. The hysteresis of a rubber compound refers to the difference between the energy applied to deform an article made from the rubber compound and the energy released as the rubber compound returns to its initial, undeformed state. In pneumatic tires, lowered hysteresis properties are associated with reduced rolling resistance and heat build-up during operation of the tire. These properties, in turn, result in such desirable characteristics as lowered fuel consumption of vehicles using such tires.

Precipitated silica has been increasingly used as a reinforcing particulate filler in rubber components of tires and mechanical goods. The reason silica is used in tires is to improve the performance balance between wet traction and rolling resistance, snow/ice traction and, mechanical properties, such as wear performance. Silica-loaded rubber stocks, however, have heretofore exhibited relatively poor resilience and high compound viscosity when used without any silane-coupling agent, which is somewhat expensive to be widely used in the industry. Even with a certain amount of silane-coupling agent, total balance of the foregoing performances was often not sufficient.

To that end, to alter or manipulate the properties of rubbery polymers, and thus the characteristics of a tire utilizing such rubbery polymer, various functional groups can be incorporated into the rubbery polymer for desirably interacting with reinforcing filler and conceivably reducing the amount of expensive silane-coupling agent. Unfortunately, due to the unpredictable interactions of the various compounds and chemicals used for synthesizing and compounding these rubbery polymers, it can be challenging to formulate useful functionalized rubber compounds that provide tires with overall desirable performance characteristics.

It is thus desirable to provide a process for synthesizing rubbery polymers that are alkoxy functionalized, wherein the rubbery polymers provide desirable dispersion of silica in rubber compounds and desirable wear properties.

SUMMARY OF THE INVENTION

In accordance with an embodiment of the present invention, a method is provided which includes synthesizing rubbery polymers that are alkoxy functionalized, e.g., alkoxysilane functionalized, by anionically polymerizing one or more different types of conjugated diene monomers and optionally vinyl aromatic monomers in the presence of an organolithium initiator compound, a lithium alkoxide, and optionally an amine compound, such as a diamine compound, then adding a halogenated coupling agent. The lithium alkoxide may be defined by the formula Li—OR', wherein R' may be an alkyl group, a cycloalkyl group, an aryl group, an alkaryl group, an arylalkyl group, or a heterocyclic alkyl group. The halogenated coupling agent may be defined by $(X_3R)_2O$, hexahaloacetone, hexahalocyclotriphosphazene, or hexahalodisilane, wherein X includes a halogen, such as chlorine, and R includes silicon or tin, and wherein halo defines a halogen, such as chlorine.

After anionic polymerization, the halogenated coupling agent reacts with live lithium chain ends of the polymerized monomers, and the lithium alkoxide and halogenated coupling agent react with one another such that the halogen atoms of the halogenated coupling agent are substituted by the alkoxy group of the lithium alkoxide. As such, the rubbery polymers so formed, such as polybutadiene rubber, styrene-butadiene rubber, isoprene- butadiene rubber, or styrene-isoprene-butadiene rubber, are alkoxy functionalized and useful in the preparation of tire tread rubber compounds, which can exhibit desirable wear and tear characteristics, particularly when such tread compounds contain silica.

By virtue of the foregoing, there is thus provided a method for synthesizing rubbery polymers that are alkoxy functionalized, wherein the rubbery polymers can provide desirable dispersion of silica in rubber compounds and, thus, desirable wear properties without substantially sacrificing other performance characteristic(s), e.g., traction properties.

DETAILED DESCRIPTION

A method is provided for synthesizing rubber polymers, such as styrene-butadiene rubber or polybutadiene rubber, that are alkoxy functionalized, e.g., alkoxysilane functionalized, and provide desirable dispersion of silica in rubber compounds for use in tire treads. To that end, the method involves mixing anionically polymerizable conjugated diene monomers with optional vinyl aromatic and an anionic-polymerization initiator, i.e., an organolithium compound, a lithium alkoxide, and optionally an amine compound, such as a diamine, to form a mixture of living polymers, then adding a halogenated coupling agent to the mixture of living polymers effecting conditions to form alkoxy functionalized rubbery polymers, as further discussed below.

The organolithium compounds can include the monofunctional and multifunctional initiator types known for polymerizing the conjugated diolefin monomers. The multifunctional organolithium initiators can be either specific organolithium compounds or can be multifunctional types that are not necessarily specific compounds but rather represent reproducible compositions of regulable functionality. The organolithium initiator can also be a functionalized compound.

The choice of initiator can be governed by the degree of branching and the degree of elasticity desired for the polymer, the nature of the feedstock, and the like. With regard to the feedstock employed as the source of conjugated diene, for example, the multifunctional initiator types generally are selected when a low concentration diene stream is at least a portion of the feedstock since some components present in the unpurified low concentration diene stream may tend to react with carbon lithium bonds to deactivate the activity of the organolithium compound, thereby necessitating the presence of sufficient lithium functionality so as to override such effects.

The multifunctional organolithium compounds which can be used include those prepared by reacting an organomonolithium compounded with a multivinylphosphine or with a multivinylsilane, such a reaction typically being conducted in an inert diluent, such as a hydrocarbon or a mixture of a hydrocarbon and a polar organic compound. The reaction between the multivinylsilane or multivinylphosphine and the organomonolithium compound can result in a precipitate which can be solubilized, if desired, by adding a solubilizing monomer such as a conjugated diene or monovinyl aromatic compound after reaction of the primary components. Alternatively, the reaction can be conducted in the presence of a minor amount of the solubilizing monomer. The relative amounts of the organomonolithium compound and the multivinylsilane or the multivinylphosphine generally should be in the range of about 0.33 to 4 moles of organomonolithium compound per mole of vinyl groups present in the multivinylsilane or multivinylphosphine employed. It is noted that such multifunctional initiators are commonly used as mixtures of compounds rather than as specific individual compounds.

The organomonolithium compounds can include ethyl lithium, isopropyl lithium, n-butyllithium, sec-butyllithium, n-heptyllithium, tert-octyl lithium, n-eicosyl lithium, phenyl lithium, 2-naphthyllithium, 4-butylphenyllithium, 4-tolyllithium, 4-phenylbutyllithium, cyclohexyl lithium, and others known to those having ordinary skill in the art.

The multivinylsilane compounds can include tetravinylsilane, methyltrivinyl silane, diethyldivinylsilane, di-n-dodecyldivinylsilane, cyclohexyltrivinylsilane, phenyltrivinylsilane, benzyltrivinylsilane, (3-ethylcyclohexyl) (3-n-butylphenyl)divinylsilane, and others known to those having ordinary skill in the art.

The multivinylphosphine compounds can include trivinylphosphine, methyldivinylphosphine, dodecyldivinylphosphine, phenyldivinylphosphine, cyclooctyldivinylphosphine, and others known to those having ordinary skill in the art.

Other multifunctional polymerization initiators can be prepared by utilizing an organomonolithium compound further in combination with a multivinylaromatic compound and either a conjugated diene or monovinylaromatic compound or both. These ingredients can be charged initially, usually in the presence of a hydrocarbon or a mixture of a hydrocarbon and a polar organic compound as a diluent. Alternatively, a multifunctional polymerization initiator can be prepared in a two-step process by reacting the organomonolithium compound with a conjugated diene or monovinyl aromatic compound additive, and then adding the multivinyl aromatic compound. Any of the conjugated dienes or monovinyl aromatic compounds described can be employed. The ratio of conjugated diene or monovinyl aromatic compound additive employed, in one example, should be in the range of about 2 to 15 moles of polymerizable compound per mole of organolithium compound. The amount of multivinylaromatic compound employed, in one example, should be in the range of about 0.05 to 2 moles per mole of organomonolithium compound.

The multivinyl aromatic compounds can include 1,2-divinylbenzene, 1,3-divinylbenzene, 1,4-divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, m-diisopropenyl benzene, p-diisopropenyl benzene, 1,3-divinyl-4,5,8-tributylnaphthalene, and others known to those having ordinary skill in the art. In one example, the multivinyl aromatic compound includes a divinyl aromatic hydrocarbon containing up to 18 carbon atoms per molecule. In another example, the divinyl aromatic hydrocarbon can include divinylbenzene, as either the ortho, meta or para isomer, commercial divinylbenzene, which is a mixture of the three isomers, or other compounds such as the ethyl styrenes.

Other types of multifunctional lithium compounds can be used, such as those prepared by contacting a sec- or tert-organomonolithium compound with 1,3-butadiene, at a ratio of about 2 to 4 moles of the organomonolithium compound per mole of the 1,3-butadiene, in the absence of added polar material, with the contacting, for example, being conducted in an inert hydrocarbon diluent. In another example, the contacting is conducted without the diluent.

Alternatively, specific organolithium compounds can be used as initiators, if desired, in the preparation of the rubbery polymers. These can be represented by $R(Li)_x$ wherein R represents a hydrocarbyl radical containing from 1 to 20 carbon atoms, and wherein x is an integer of 1 to 4. The organolithium compounds can include methyl lithium, isopropyl lithium, n-butyllithium, sec-butyllithium, hexyllithium, tert-octyl lithium, n-decyl lithium, phenyl lithium, 1-naphthyllithium, 4-butylphenyllithium, p-tolyl lithium, 4-phenylbutyllithium, cyclohexyl lithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butane, 1,8-dilithio-3-decene, 1,2-dilithio-1,8-diphenyloctane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and others known to those having ordinary skill in the art.

The organolithium compound can be an alkylsilyloxy protected functional lithium compound. For instance, the initiator can be an alkylsilyloxy protected functional lithium initiator of the structural formula:

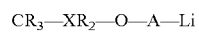

wherein X represents a group IVa element selected from carbon, germanium, or tin; wherein R represents alkyl groups that can be the same or different and that contain from 1 to about 8 carbon atoms; and wherein A represents an akylene group; or:

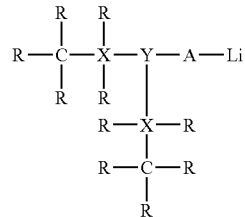

wherein X represents a group IVa element selected from carbon, germanium, or tin; wherein Y represents oxygen, phosphorous, or nitrogen; wherein R represents alkyl groups that can be the same or different and that contain from 1 to about 8 carbon atoms; and wherein A represents an alkylene group; or (c):

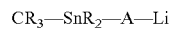

wherein R represents alkyl groups that can be the same or different and that contain from 1 to about 8 carbon atoms, and wherein A represents an alkylene group. The alkylene group can be straight chained or branched. For instance, A can represent a straight chained alkylene group of the structural formula —$(CH_2)n$— or it can represent a branched alkylene group, such as:

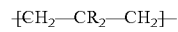

wherein R represents alkyl groups that can be the same or different and that contain from 1 to about 8 carbon atoms. In one example, R represents an alkyl group containing from 1 to about 4 carbon atoms. In another example, R represents methyl groups.

The alkylsilyloxy protected functional lithium initiator will typically be of the structural formula:

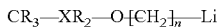

wherein X represents a group IVa element selected from carbon, silicon, germanium, or tin; wherein n represents an integer from 1 to 10; wherein R represents alkyl groups that can be the same or different and that contain from 1 to about 8 carbon atoms; or an alkylsilyloxy protected functional lithium compound of the structural formula:

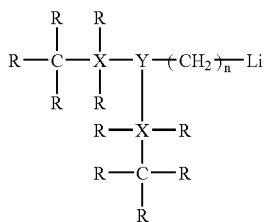

wherein X represents a group IVa element selected from carbon, silicon, germanium, or tin; wherein Y represents oxygen, phosphorous, or nitrogen; wherein n represents an integer from 1 to 10; wherein R represents alkyl groups that can be the same or different and that contain from 1 to about 8 carbon atoms. These rubbery polymers will accordingly normally contain a "living" lithium chain end.

In another example, the alkylsilyloxy protected functional lithium initiator may be of the structural formula:

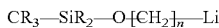

wherein n represents an integer from 1 to 10, and wherein R represents alkyl groups that can be the same or different and that contain from 1 to about 8 carbon atoms.

The molar ratio of the organolithium compound to the lithium alkoxide will typically be within the range of about 0.1:1 to about 20:1. In one example, the molar ratio is within the range of 0.5:1 to about 15:1. In another example, the molar ratio of the organolithium compound to the lithium alkoxide is within the range of about 1:1 to about 6:1. In yet another example, the molar ratio is within the range of about 1:1 to about 4:1.

The organolithium compound will normally be present in the polymerization medium in an amount that is within the range of about 0.01 to about 1.5 phm (parts by 100 parts by weight of total monomer). In one example, from about 0.01 phm to about 1.2 phm of the organolithium compound can be utilized. In another example, from about 0.025 phm to about 0.07 phm of the organolithium compound in the polymerization medium can be utilized.

The lithium alkoxide is reactive with the halogenated coupling agent, as further discussed below, and has the general formula Li—OR', where R' may be an alkyl group, a cycloalkyl group, an aryl group, an alkaryl group, an arylalkyl group, or a heterocyclic alkyl group. The R' group is defined by the organic group attached to the oxygen atom of an alcohol compound used in synthesis of the lithium alkoxide. The alcohols used can be any suitable primary, secondary, or tertiary alcohol that typically is soluble in hydrocarbon solvents and other non-polar organic solvents. For example, the alcohol can include methanol, ethanol, propanol, isopropanol, n-butanol, cyclopentanol, cycloheptanol, cyclohexanol, s-butanol, t-butanol, allyl alcohol, pentanol, hexanol, octanol, decanol, 2-isopropyl-5-methylcyclohexanol, 2-tert-butyl-5-methylcyclohexano, menthol, thymol, furfuryl alcohol, tetrahydrofurfuryl alcohol, N-piperidinomethanol, 2-N-piperidinoethanol, N-pyrrolidinomethanol, or 2-N-pyrrolidinoethanol mixtures of the same, and others known to those having ordinary skill in the art. In one embodiment, the R' group may have from 1 to about 12 carbon atoms. In yet another embodiment, the R' group may have from about 3 to about 8 carbon atoms.

Some representative examples of lithium alkoxides include, but are not limited to, lithium methoxide, lithium ethoxide, lithium isopropoxide, lithium n-butoxide, lithium sec-butoxide, lithium t-butoxide, lithium 1,1-dimethylpropoxide, lithium 1,2-dimethylpropoxide, lithium 1,1-dimethylbutoxide, lithium 1,10-dimethylpentoxide, lithium 2-ethylhexanoxide, lithium 1-methylheptoxide, lithium phenoxide, lithium p-methylphenoxide, lithium p-octylphenoxide, lithium p-nonylphenoxide, lithium p-dodecylphenoxide, lithium alpha-naphthoxide, lithium beta-naphthoxide, lithium o-methoxyphenoxide, lithium o-methoxyphenoxide, lithium m-methoxyphenoxide, lithium p-methoxyphenoxide, lithium o-ethoxyphenoxide, lithium 4-methoxy-1-naphthoxide, lithium 2,2-dimethylbutoxide, and others known to those having ordinary skill in the art.

The molar ratio of the organolithium compound to the lithium alkoxide will typically be within the range of about 0.1:1 to about 1:20. In one example, the molar ratio is within the range of 0.5:1 to about 1:10. In another example, the molar ratio of the organolithium compound to the lithium alkoxide is within the range of about 1:1 to about 1:6. In yet another example, the molar ratio is within the range of about 1:1 to about 1:4.

The lithium alkoxide will normally be present in the polymerization medium in an amount that is within the range of about 0.01 to about 1.5 phm (parts by 100 parts by weight of total monomer). In one example, from about 0.01 phm to about 1.2 phm of the lithium alkoxide can be utilized.

The halogenated coupling agent may be generally defined by $(X_3R)_2O$, wherein X includes a halogen, such as chlorine, and R includes silicon (Si) or tin (Sn) to provide, for example, hexachlorodisiloxane, i.e., $(Cl_3Si)_2O$, or hexachloroditin oxide, i.e., $(Cl_3Sn)_2O$. In one embodiment, R is silicon. The coupling agent can further include, for example, hexahaloacetone, hexahalocyclotriphosphazene, or hexahalodisilane, wherein the halo defines a halogen, e.g., chlorine, such as to provide hexachloroacetone. Accordingly, each halogenated coupling agent provides six reactive halogen atoms.

To produce the resulting alkoxy functionalized rubbery polymers of the present invention, the halogenated coupling agent, e.g., $(Cl_3Si)_2O$, reacts after anionic polymerization with live lithium chain ends of the polymerized monomers to provide, for example, [polymer]-Si(Cl)$_2$—O—Si(Cl)$_3$, [polymer]$_2$-Si(Cl)$_2$—O—Si(Cl)$_3$, or Si[polymer]$_3$—O—Si(Cl)$_3$ wherein the [polymer] defines the polymerized diene monomers optionally with vinyl aromatic monomers. The lithium alkoxide then further reacts with that halogenated coupling agent so as to provide the alkoxy functionalized rubbery polymer, e.g., Si[polymer]$_3$—O—Si(OR')$_3$. Accordingly, the halogens of the halogenated coupling agent can be replaced with the alkoxy groups of the lithium alkoxides. To that end, the alkoxy groups of 3 mmoles of lithium alkoxide, for example, can replace the halogen atoms of 3 mmoles of halogenated coupling agent. Accordingly, full substitution of the halogen atoms results if the ratio of lithium alkoxide to halogenated coupling agent is 1:1. In this fashion, the molecular weight of the resulting rubbery polymer may be increased.

The molar ratio of the halogenated coupling agent to the lithium alkoxide will typically be within the range of about 1:0.1 to about 1:20. In one example, the molar ratio is within the range of 1:0.5 to about 1:15. In another example, the molar ratio of the halogenated coupling agent to the lithium alkoxide is within the range of about 1:1 to about 1:6. In yet another example, the molar ratio is within the range of about 1:1 to about 1:5.

The halogenated coupling agent will normally be present in the polymerization medium in an amount that is within the range of about 0.01 to about 1.5 phm (parts by 100 parts by weight of total monomer). In one example, from about 0.01 phm to about 1.2 phm of the halogenated coupling agent can be utilized.

The optional amine compound may include a diamine compound, such as an aliphatic diamines or bicyclic chelating diamine compounds. The bicyclic chelating diamine compounds generally may be defined as two fused rings with at least one ring including two nitrogen atoms. For example, the bicyclic chelating diamine compound may include 1,4-diazabicyclo[2.2.2]octane (DABCO) and others known to those having ordinary skill in the art. The aliphatic diamines can include primary, secondary, or tertiary amines, or combinations thereof. In one example, the aliphatic diamine is an aliphatic bis-primary diamine, such as ethylene diamine or 1,3-diaminopropane. In yet another embodiment, the aliphatic diamines is an aliphatic bis-tertiary diamine, such as N,N,N',N'-tetramethylethylene diamine ("TMEDA").

The molar ratio of the amine compound to the organolithium is within the range of about 0.1:1 to about 20:1. In another example, the molar ratio is from about 0.5:1 to about 15:1. In another example, the molar ratio of the amine compound to the organolithium is within the range of about 1:1 to about 8:1. In yet another example, the molar ratio is within the range of about 1:1 to about 6:1.

The amine compound may be present in the polymerization medium in an amount, which is within the range of about 0.20 to about 8.00 phm (parts by 100 parts by weight of total monomer).

As mentioned above, the method includes the synthesis of rubbery polymers that are alkoxy functionalized which can be utilized in tire tread rubbers, particularly in those treads containing silica fillers. The rubbery polymers can be synthesized from one or more different types of conjugated diene monomers, such as 1,3-butadiene, isoprene, 2,3-dimethylbutadiene, and optionally vinyl aromatic monomers, such as vinyl, divinyl, or trivinyl benzene monomers, including styrene, α-methyl styrene, p-tertiary-butyl styrene, methyl vinyl toluene, p-vinyl toluene. In one embodiment, the rubbery polymer defines a homopolymer. In another embodiment, the rubbery polymer defines a heteropolymer or a terpolymer. In another embodiment, the rubbery polymer defines a heteropolymer or a terpolymer with at least one polymerized monomer selected from butadiene.

In one example, the monomer is 1,3 butadiene to provide a polybutadiene rubber, i.e., a homopolymer. In another example, the monomers include 1,3 butadiene and styrene or 1,3 butadiene and isoprene to provide, respectively, a styrene-butadiene rubber or isoprene-butadiene rubber, which are copolymers. In another example, the monomers include 1,3 butadiene, isoprene, and styrene to provide a styrene-isoprene-butadiene rubber, i.e., a terpolymer.

The polymerizations are typically carried out in a hydrocarbon solvent, such as one or more aromatic, paraffinic or cycloparaffinic compounds. The solvents generally will contain from 4 to 10 carbon atoms per molecule and will be liquid under the conditions of the polymerization. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, and petroleum naphtha, alone or in admixture. In the solution polymerizations, there typically will be from about 5 to about 30 weight percent monomers in the polymerization medium. Such polymerization media are comprised of the organic solvent and monomers. In another example, the polymerization medium may contain from about 10 to about 25 weight percent monomers. In yet another example, the polymerization medium can contain about 15 to about 20 weight percent monomers.

The copolymer rubbers derived from a conjugated diene monomer and a vinyl aromatic monomer will typically contain from about 2 weight percent to about 50 weight percent vinyl aromatic monomer, such as styrene, and from about 50 weight percent to about 98 weight percent conjugated diene monomer, such as 1,3-butadiene. However, in some cases, the amount of vinyl aromatic monomer included will be as low as about 1 weight percent. In another example, the copolymer rubbers will contain from about 3 weight percent to about 30 weight percent vinyl aromatic monomer and from about 70 weight percent to about 97 weight percent 1,3-conjugated diene monomer.

The copolymer rubbers derived from two different types of conjugated diene monomers, with one monomer being butadiene, will typically contain from about 50 weight percent to about 98 weight percent 1,3-butadiene and from about 2 weight percent to about 50 weight percent other conjugated diene monomer, such as isoprene. However, in some cases, the amount of other conjugated diene monomer included will be as low as about 1 weight percent.

The terpolymer rubbers derived from at least two different conjugated diene monomers, with one monomer being butadiene, and a vinyl aromatic monomer will typically contain from about 50 weight percent to about 98 weight percent 1,3-butadiene and from about 2 weight percent to about 50 weight percent vinyl aromatic monomer plus other conjugated diene monomer, such as isoprene.

The distribution of repeat units in the copolymer and terpolymer rubbers is essentially random. The term "random" as used herein means that less than 10 percent of the total quantity of repeat units of a monomer are in blocks containing more than five repeat units. In other words, more than 90 percent of the repeat units are in blocks containing five or fewer repeat units. The copolymers and terpolymers also tend to have a consistent composition throughout their polymer chains. In other words, the content of a specific monomer of the polymer will be about the same from the beginning to the end of the polymer chain. For example, no segments of at least 100 repeat units within the polymer will have a styrene content which differs from the total styrene content of the polymer by more than about 10 percent.

Polymers produced according to this invention can be of any molecular weight depending on the intended application. Generally, for purposes of making tire products, the average molecular weight of the rubbery polymers should fall within the range from about 50,000 to about 1,000,000. In another example, the average molecular weight of the rubbery polymers is from about 80,000 to about 500,000.

The polymerizations of this invention can be initiated by adding the organolithium compound to a polymerization medium, or premix, containing the monomers to be polymerized, along with the lithium alkoxide, and optionally an amine compound. The organolithium compound may be added to the premix in any desired amount. In one example, the organolithium compound is provided in an amount of about 0.100 mmole to about 0.900 mmol/per 100 parts by weight of total monomer. In another example, the organolithium compound is provided in an amount of about 0.200 mmole to about 0.700 mmol/per 100 parts by weight of total monomer. The polymerizations can be carried out utilizing batch, semi-continuous or continuous techniques, as known to those having ordinary skill in the art.

Following anionic polymerization of the rubbery monomers in the presence of the organolithium compound, the lithium alkoxide and optional amine, the halogenated coupling agent can be added to the mixture of living polymers effecting conditions to form the alkoxy functionalized rubbery polymer. More specifically, the halogenated coupling agent, e.g., $(Cl_3Si)_2O$, reacts with live lithium chain ends to provide, for example, [polymer]$_3$Si—O—Si(Cl)$_3$, wherein the [polymer] defines polymerized diene monomers optionally with vinyl aromatic monomers. The lithium alkoxide then can further react therewith so as to provide the alkoxy functionalized rubbery polymer, e.g., [polymer]$_3$Si—O—Si(OR')$_3$. In turn, the alkoxy groups may further react with hydroxyl groups of silica filler, which are contained in rubber compounds, such rubber compounds incorporating the functionalized rubbery polymer to provide desirable polymer-filler interaction.

The anionic polymerization is conducted for a length of time sufficient to permit substantially complete polymerization of monomers. In other words, the polymerization is normally carried out until high conversions are attained. The polymerization temperature utilized can vary over a broad temperature range of from about 20° C. to about 180° C. In another example, a temperature within the range of about 40° C. to about 120° C. can be utilized. In yet another example, the polymerization temperature can be within the range of about 70° C. to about 100° C. The pressure used will normally be sufficient to maintain a substantially liquid phase under the conditions of the polymerization reaction.

After the polymerization and reaction with the halogenated coupling agent has been completed, the rubbery polymer, which is alkoxy functionalized, such as alkoxysilane functionalized, can be recovered from the organic solvent. The rubbery polymer can be recovered from the organic solvent and residue by means such as decantation, filtration, centrification, and others known to those having ordinary skill in the art. It can be desirable to precipitate the polymer from the organic solvent by the addition of lower alcohols containing from about 1 to about 4 carbon atoms to the polymer solution. Suitable lower alcohols for precipitation of the segmented polymer from the polymer cement include methanol, ethanol, isopropyl alcohol, normal-propyl alcohol and t-butyl alcohol. The utilization of lower alcohols to precipitate the rubber from the polymer cement also "kills" or terminates the living polymer by inactivating lithium end groups of the organolithium compound. The polymerization can also be terminated with other conventional noncoupling types of terminators, such as water, an acid, or with a coupling agent, for example. After the polymer is recovered from the solution, steam-stripping can be employed to reduce the level of volatile organic compounds in the rubber.

There are certain benefits in tire tread compounds derived from the rubbery polymers. For example, polybutadiene rubber, styrene-butadiene rubber, isoprene-butadiene rubber, or styrene-isoprene-butadiene rubber can be blended, for example, with natural rubber and/or other synthetic rubbers containing silica filler to make tread compounds for passenger tires that can exhibit desirable rolling resistance, traction, tear, and/or tread wear characteristics.

Non-limiting examples of the method in accordance with the description are now disclosed below. These examples are merely for the purpose of illustration and are not to be regarded as limiting the scope of the invention or the manner in which it can be practiced. Other examples will be appreciated by a person having ordinary skill in the art. Unless specifically indicated otherwise, parts and percentages are given by weight.

EXAMPLE 1

In this experiment, 2000 g of a hexane premix containing about 20% monomer(s) consisting of 20% styrene and 80% butadiene was charged to a one gallon stainless steel reactor with an air-driven motor, a nitrogen inlet for providing an inert nitrogen atmosphere, and internal heating/cooling coils for temperature regulation. 0.5 mmol butyllithium, 3 mmol lithium t-butoxide, and 1 mmol N,N,N',N'-tetramethylethylenediamine (TMEDA) were added to the premix. Polymerization was carried out at 65° C. and the reaction monitored using gas chromatography ("GC") to detect for the presence of unreacted monomers.

After polymerization was completed, 3 mmol hexachlorodisiloxane, i.e., $(Cl_3Si)_2O$, was added to the reactor. Ethanol was added to shortstop the polymerization. The polymer cement was then removed from the reactor and stabilized with antioxidant. After evaporating hexanes, the resulting polymer was dried in a vacuum oven providing alkoxy functionalized styrene-butadiene rubber (SBR). That alkoxy functionalized styrene-butadiene rubber was recovered and fully characterized using, for example, gel permeation chromatography (GPC).

The base polymer molecular weight was analyzed to be about 80,000 before addition of the halogenated coupling. GPC analysis suggested that the molecular weight of the resulting alkoxy functionalized styrene-butadiene rubber was about 240,000 or about 3× that of its precursor, which suggested that the alkoxy groups from 3 mmoles lithium tertiary butoxide have been attached to the siloxane, i.e. 3 alkoxy groups have replaced 3 chlorine atoms. In other words, after the addition of hexachlorodisiloxane, the hexachlorodisiloxane reacted with live lithium chain ends to provide, for example, Si[SBR]$_3$—O—Si(Cl)$_3$, wherein the [polymer] defined polymerized butadiene and styrene monomers. The 3 mmoles lithium t-butoxide then further reacted therewith so as to provide the alkoxy functionalized rubbery polymer, e.g., Si[SBR]$_3$—O—Si(OR')$_3$, where OR' is t-butoxide.

EXAMPLE 2

The procedure described in Example 1 was utilized in this example except that hexachloroditin oxide was used instead of hexachlorodisiloxane. GPC analysis suggested that the molecular weight of the alkoxy functionalized styrene-butadiene rubber was about 320,000 or about 4× that of its precursor, which suggested that the alkoxy groups from 2 mmoles lithium tertiary butoxide have been attached to the ditin oxide, i.e. the alkoxy groups have replaced chlorine atoms.

EXAMPLE 3

The procedure described in Example 1 was utilized in this example except that hexachlorodisilane was used instead of hexachlorodisiloxane. GPC analysis suggested that the molecular weight of the alkoxy functionalized styrene-butadiene rubber was about 240,000 or about 3× (i.e., Mw 240,000) that of its precursor, which suggested that the alkoxy groups from the 3 mmoles lithium tertiary butoxide have been attached to the disilane i.e. the alkoxy groups have replaced chlorine atoms.

EXAMPLE 4

The procedure described in Example 1 was utilized in this example except that hexachloroacetone was used instead of hexachlorodisiloxane. GPC analysis suggested that the molecular weight of the alkoxy functionalized styrene-butadiene rubber was about 240,000 or about 3× that of its precursor, which suggested that the alkoxy groups from the 3 mmoles lithium tertiary butoxide have been attached to the acetone, i.e. the alkoxy groups have replaced chlorine atoms.

Accordingly, the solution polymerizations using the organolithium compound, and lithium alkoxides and halogenated coupling agents, in accordance with the present invention, produced alkoxy functionalized styrene-butadiene rubber. These alkoxy functionalized rubbery polymers may be further compounded with additional ingredients to provide a rubber compound, such as for use in a tire tread for a tire, which may have desirable characteristics. Specifically selected additives may be provided in the rubber compound, such as, for example, fillers including silica and mixtures thereof with carbon black, and curing agents. Other additives may be added as desired including curing aids such as activators, retarders and accelerators, rubber processing oils, resins including tackifying resins, plasticizers, fatty acid, zinc oxide, waxes, antidegradant, antiozonants, and peptizing agents. These other additives, depending on the intended use of the rubber compound, are selected and used in conventional amounts.

The rubber compound, which includes, for example, the alkoxy functionalized rubbery polymer, silica, and curing agent, may be compounded by methods generally known in the rubber compounding art, such as by mixing the various constituent materials in the amounts listed above at a temperature in a range of from about 135° C. to about 180° C. to form a green rubber. The green rubber may be further formed into a tire tread and cured on a tire (not shown) by means well known in the art. Such rubber compound provides desirable wear properties without substantially sacrificing other performance characteristic(s), e.g., traction properties.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative product and method and illustrative examples shown and described. Accordingly, departures may be made from such details without departing from the scope of the general inventive concept.

What is claimed is:

1. A method comprising:
   synthesizing rubbery polymers that are alkoxy functionalized by anionically polymerizing one or more different types of conjugated diene monomers and optionally vinyl aromatic monomers in the presence of an organolithium initiator compound and a lithium alkoxide, the lithium alkoxide being defined by the formula Li—OR', wherein R' is an alkyl group, a cycloalkyl group, an aryl group, an alkaryl group, an arylalkyl group, or a heterocyclic alkyl group, and adding a halogenated coupling agent to the mixture, the halogenated coupling agent being defined by $(X_3R)_2O$, hexahaloacetone, hexahalocyclotriphosphazene, or hexahalodisilane, wherein X is a halogen and R is silicon or tin, and wherein halo defines a halogen.

2. The method of claim 1 wherein anionically polymerizing the conjugated diene monomers includes polymerizing the vinyl aromatic monomer with the one or more different types of conjugated diene monomers, the vinyl aromatic monomer being styrene and the one or more different types of conjugated diene monomers being butadiene or butadiene and isoprene for synthesizing styrene-butadiene rubber or styrene-isoprene-butadiene rubber that is alkoxy functionalized.

3. The method of claim 1 wherein polymerizing the conjugated diene monomers in the presence of the catalyst system includes polymerizing the one or more different types of conjugated diene monomers, and wherein the one or more different types of conjugated diene monomers is butadiene or butadiene and isoprene for synthesizing polybutadiene rubber or isoprene-butadiene rubber that is alkoxy functionalized.

4. The method of claim 1 wherein the halogenated coupling agent is defined by $(X_3R)_2O$, wherein X is a halogen and R is silicon or tin.

5. The method of claim 4 wherein the halogen is chlorine and R is silicon.

6. The method of claim 4 wherein the R' is an alkyl group.

7. The method of claim 1 wherein the halogenated coupling agent is a hexahaloacetone, hexahalocyclotriphosphazene, or hexahalodisilane, wherein halo defines a halogen.

8. The method of claim 7 wherein the halogen is chlorine to define hexachloroacetone, hexachlorocyclotriphosphazene, or hexachlorodisilane.

9. A method comprising:
   mixing anionically-polymerizable monomers, an organolithium initiator compound, and a lithium alkoxide to form a mixture of living polymers, the lithium alkoxide being defined by the formula Li—OR', wherein R' is an alkyl group, a cycloalkyl group, an aryl group, an alkaryl group, an arylalkyl group, or a heterocyclic alkyl group;
   adding a halogenated coupling agent to the mixture of living polymers, the halogenated coupling agent being defined by $(X_3R)_2O$, hexahaloacetone, hexahalocyclotriphosphazene, or hexahalodisilane, wherein X is a halogen and R is silicon or tin, and wherein halo defines a halogen, and
   wherein the halogenated coupling agent reacts with live lithium chain ends of the polymerized monomers and wherein the lithium alkoxide and halogenated coupling agent react so that the halogen atoms of the halogenated coupling agent are substituted by the alkoxy group of the lithium alkoxide for synthesizing an alkoxy functionalized rubbery polymer.

10. The method of claim 9 wherein the anionically-polymerizable monomers are butadiene, styrene and butadiene, isoprene and butadiene, or styrene, butadiene and isoprene for synthesizing polybutadiene rubber, styrene-butadiene rubber, isoprene-butadiene rubber, or styrene-isoprene-butadiene rubber that is alkoxy functionalized.

11. The method of claim 9 wherein the halogenated coupling agent is defined by $(X_3R)_2O$, wherein X is a halogen and R is silicon or tin.

12. The method of claim 11 wherein the halogen is chlorine and R Is silicon.

13. The method of claim 11 wherein R' is an alkyl group.

14. The method of claim 9 wherein the halogenated coupling agent is a hexahaloacetone, hexahalocyclotriphosphazene, or hexahalodisilane, wherein halo defines a halogen.

15. The method of claim 14 wherein the halogen is chlorine to define hexachloroacetone, hexachlorocyclotriphosphazene, or hexachlorodisilane.

16. A tire comprising:

a rubber compound including a rubbery polymer that is alkoxy functionalized resulting from the method comprising anionically polymerizing one or more different types of conjugated diene monomers and optionally vinyl aromatic monomers in the presence of an organolithium initiator compound and a lithium alkoxide, the lithium alkoxide being defined by the formula Li—OR', wherein R' is an alkyl group, a cycloalkyl group, an aryl group, an alkaryl group, an arylalkyl group, or a heterocyclic alkyl group, and adding a halogenated coupling agent to the mixture, the halogenated coupling agent being defined by $(X_3R)_2O$, hexahaloacetone, hexahalocyclotriphosphazene, or hexahalodisilane, wherein X includes is a halogen and R is silicon or tin, and wherein halo defines a halogen.

17. The tire of claim 16 wherein the rubber compound further includes silica filler.

* * * * *

UNITED STATES PATENT AND TRADEMARK OFFICE
CERTIFICATE OF CORRECTION

PATENT NO. : 7,335,706 B1  Page 1 of 1
APPLICATION NO. : 11/682050
DATED : February 26, 2008
INVENTOR(S) : Adel Farhan Halasa et al.

It is certified that error appears in the above-identified patent and that said Letters Patent is hereby corrected as shown below:

Column 6, line 3, change "methylcyclohexano" to --methylcyclohexanol--.

Column 6, line 16, change "1,10" to --1,5--.

Column 7, line 19, after "as" delete "an".

Column 7, line 30, change "diamines" to --diamine--.

Column 13, line 13, Claim 12, change "Is" to --is--.

Column 14, line 15, Claim 16, after "X" delete "includes".

Signed and Sealed this

Second Day of June, 2009

JOHN DOLL
*Acting Director of the United States Patent and Trademark Office*